United States Patent [19]

Caputo et al.

[11] 4,123,160

[45] Oct. 31, 1978

[54] METHOD AND APPARATUS FOR REMOTELY MEASURING SUB-SURFACE WATER TEMPERATURES

[76] Inventors: Bernard Caputo, Sprucewood Cir., Boxford, Mass. 01921; Donald A. Leonard, 594 Main St., Stoneham, Mass. 02180

[21] Appl. No.: 752,161

[22] Filed: Dec. 20, 1976

[51] Int. Cl.² .................... G01J 5/44; G01J 5/60
[52] U.S. Cl. ............................. 356/75; 356/43
[58] Field of Search ................ 356/43, 75, 114

[56] References Cited

U.S. PATENT DOCUMENTS 3,986,775  10/1976  Chang et al. .................... 356/75

OTHER PUBLICATIONS

Cunningham et al., "Depolarization Ratio Studies on Liquid Water," Jr. of Chem. Physics, 8-1973, pp. 2132-2139.
Freeman, S. K., "Applications of Laser Raman Spectroscopy", Wiley–Interscience Pub., John Wiley & Sons, 1974.

Primary Examiner—John K. Corbin
Assistant Examiner—Wm. H. Punter
Attorney, Agent, or Firm—Morse, Altman, Oates & Bello

[57] ABSTRACT

The sub-surface temperature of a body of water, such as an ocean, is measured remotely by directing a laser beam into a body of water and analyzing the Raman backscatter produced by the water. The Raman backscatter contains information which, when processed, indicates the water temperature at various depths. Precise temperature measurements may be made by separately detecting and measuring the polarization ratio at different wavelength intervals throughout the Raman band and measuring the differential diffuse attenuation coefficient using range-gated Raman backscatter techniques on a wavelength by wavelength basis.

9 Claims, 10 Drawing Figures

POLYMER $\rightleftharpoons^{K(T)}$ MONOMER $I(\lambda_1)/I(\lambda_2) \alpha$ (MONOMER)/(POLYMER) = f(T)

METHOD AND APPARATUS FOR REMOTELY MEASURING SUB-SURFACE WATER TEMPERATURES

BACKGROUND OF THE INVENTION

1. Field of the Invention

This invention relates generally to remotely measuring the sub-surface temperature of a body of water and more particularly is directed towards a new and improved method and apparatus for quickly and precisely measuring sub-surface water temperatures from an aircraft or other such platform.

2. Description of the Prior Art

Accurate information with respect to a temperature profile of a large body of water, such as an ocean, is important for many reasons. For example, the ocean acts as a large heat reservoir, as well as a dominant source of atmospheric moisture. As a result, sea temperatures have a very strong influence on weather and climate conditions and the information is thus useful in making forecasts. Another use for this type of information is for monitoring thermal patterns in the ocean such as the thermal plumes released from power plants or the like, using sea water as a coolant.

While there presently exists a number of techniques for measuring the temperature of a large body of water, none of these is entirely satisfactory. For example, using remotely located infrared sensors, the surface of the water may be measured but no measurements can be made to any appreciable depth using such means. Sub-surface temperatures may be measured by on site devices such as thermistors, thermometers, and the like, which may be dragged through the water or set in position by buoys or the like. The latter techniques are slow in gathering the data, as well as being expensive and requiring considerable manpower and upkeep. Further, such techniques are not suitable for gathering data over a wide area and thus have limited utility.

Accordingly, it is an object of the present invention to provide a new and improved method and apparatus for remotely measuring sub-surface temperatures in a body of water. Another object of this invention is to provide a high precision, sub-surface temperature ocean profiler that may be transported by aircraft or the like to gather water temperature data over a wide area.

SUMMARY OF THE INVENTION

This invention features a method and associated apparatus for measuring sub-surface temperatures of a body of water comprising the steps of directing a laser beam from above the water surface into the water, then detecting and analyzing the Raman backscatter produced by the beam to obtain water temperature information at different depths. A high level of precision is obtained by measuring two components of Raman radiation over the same wavelength interval but having different modes of polarization. Using pure right circularly polarized light incident on a water scattering volume, the Raman scattering produced thereby contains both left and right circularly polarized components, the ratio of the intensity of one to the other component being a function of the water temperature.

This invention also features a system and apparatus for automatically performing the foregoing method.

DETAILED DESCRIPTION OF THE PREFERRED EMBODIMENTS

Figure 1:
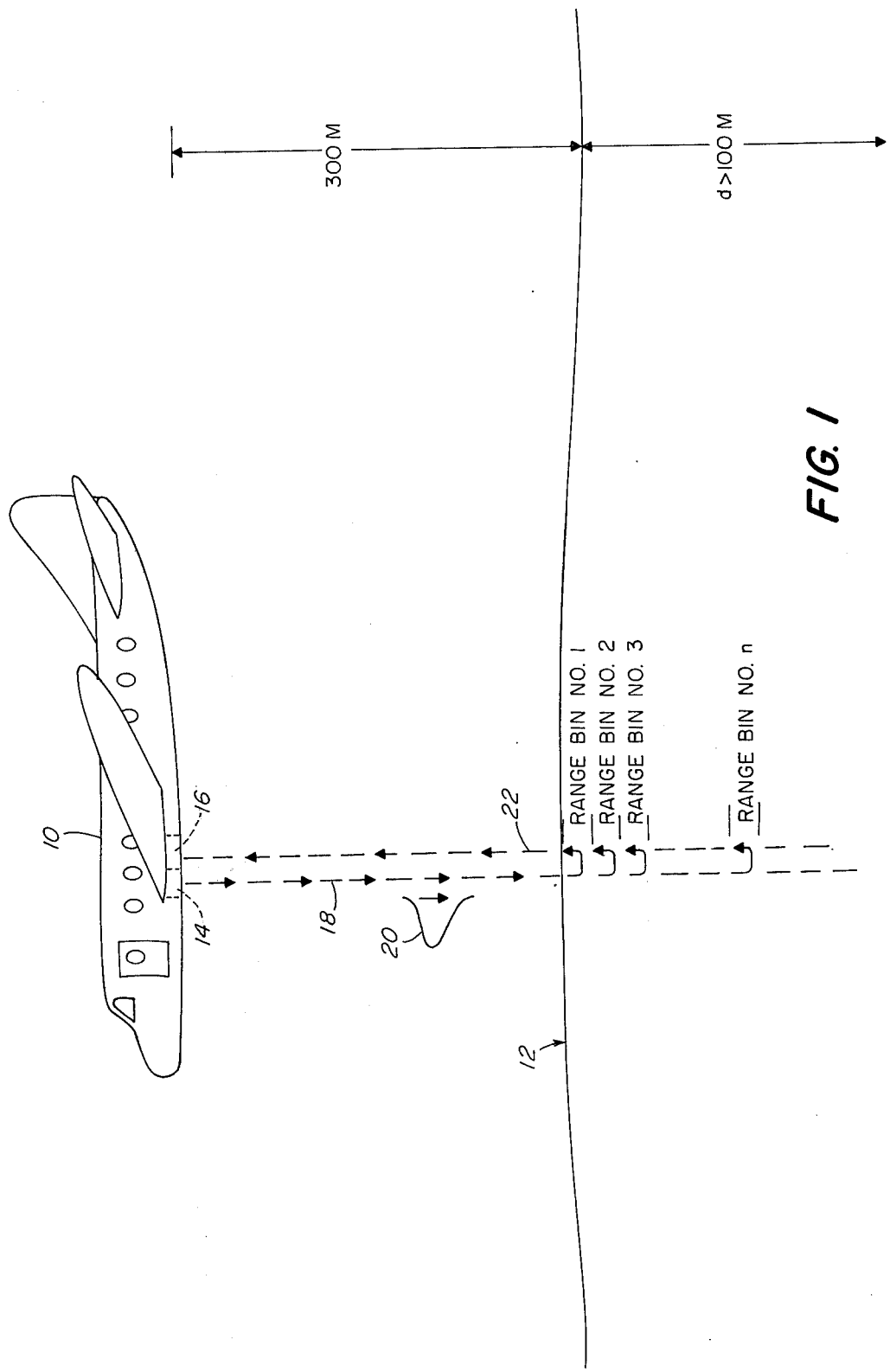
FIG. 1 is a schematic view demonstrating a typical application of the invention.

Referring now to the drawings, and to FIG. 1 in particular, there is illustrated a view demonstrating the basic operation of the invention as applied to its use on an aircraft 10. As shown, the aircraft 10 is flying over a body of water 12 at a known altitude such as 300 meters, for example. The aircraft is equipped with a transmitter 14 and a receiver 16 made according to the invention, the transmitter being adapted to produce a pulsed laser beam 18 comprised of a series of light pulses 20 directed downwardly against the body of water 12. The light beam 18 will penetrate the water surface to a substantial depth and will produce a return signal 22 comprised of Raman backscatter which is detected by the gated receiver 16 where the signal is processed and analyzed to obtain information with respect to the temperature of the water 12 at various depths.

The Raman backscatter return signal 22 is the result of a phenomonon observed in the scattering of light on passage through a material medium whereby the light suffers a change in frequency and a random alteration in phase. Raman scattering differs in both these respects from Rayleigh and Tyndall scattering in which the scattered light has the same frequency as the unscattered and bears a definite phase relation to it. The intensity of Raman scattering is roughly one thousandth that of Rayleigh scattering in liquids and smaller still in gases. Raman scattering may be analyzed by spectroscopic means. The collection of new frequencies appearing in the spectrum of monochromatic radiation scattered by a substance is characteristic of the substance and is called its Raman spectrum.

Insofar as water is opaque to infrared and microwave radiation, a visible laser is used to optimize the transmission in water and generate the Raman scattered return signal. The Raman scattered return shifted by the O-H stretch frequency of about 3400 $CM^{-1}$ is collected and analyzed to determine the temperature. By using a short pulse laser and range gating techniques, depth resolution is attainable. Penetration and temperature collecting capability is possible using this technique up to a depth of perhaps 100 meters. The technique has a precision capability of plus or minus 1° C. over a temperature range of 0° to 35° C. Surface resolution is on the order of 1 kilometer which depth resolution is on the order of one meter.

Using a blue-green pulsed laser to illuminate water, the Raman backscattered side bands from the water molecule at different wavelengths are detected and analyzed to determine the temperature. Depth resolution is determined by the transmitter-receiver system which is operated in a manner much like a radar so that the time delay between the transmitted and received pulses determines the depth at which the temperature is being measured.

Figure 3:
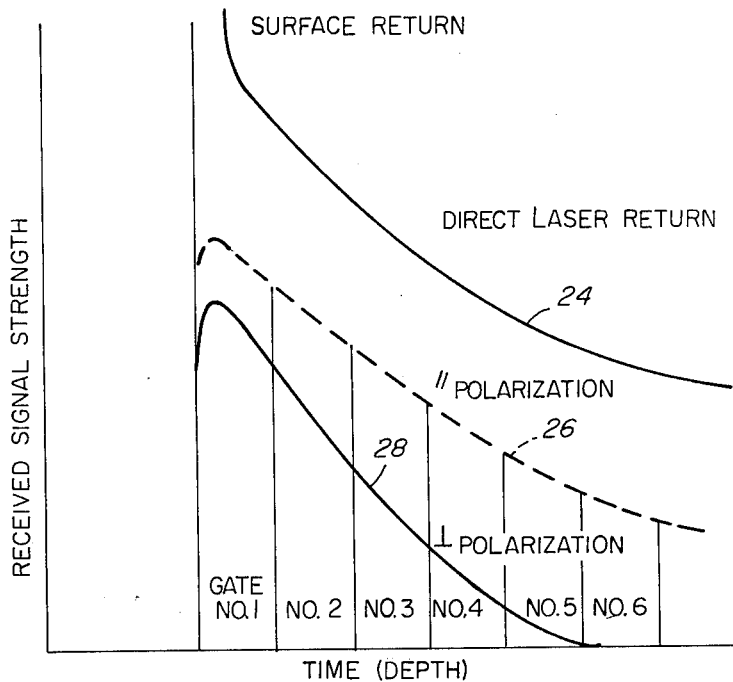
FIG. 3 is a graphic display of a typical signal return.

Referring now to FIG. 3, there is shown a plot of the typical signal return that would be received using two polarization channels and the on-frequency direct laser return. Detection time gates, set in relation to the strong laser surface return (curve 24), detect and digitize the signals from the parallel and right angle polarization channel curves 26 and 28, respectively. The ratio average of the two polarizations during each time gate determines the average temperature during that time interval.

Figure 2:
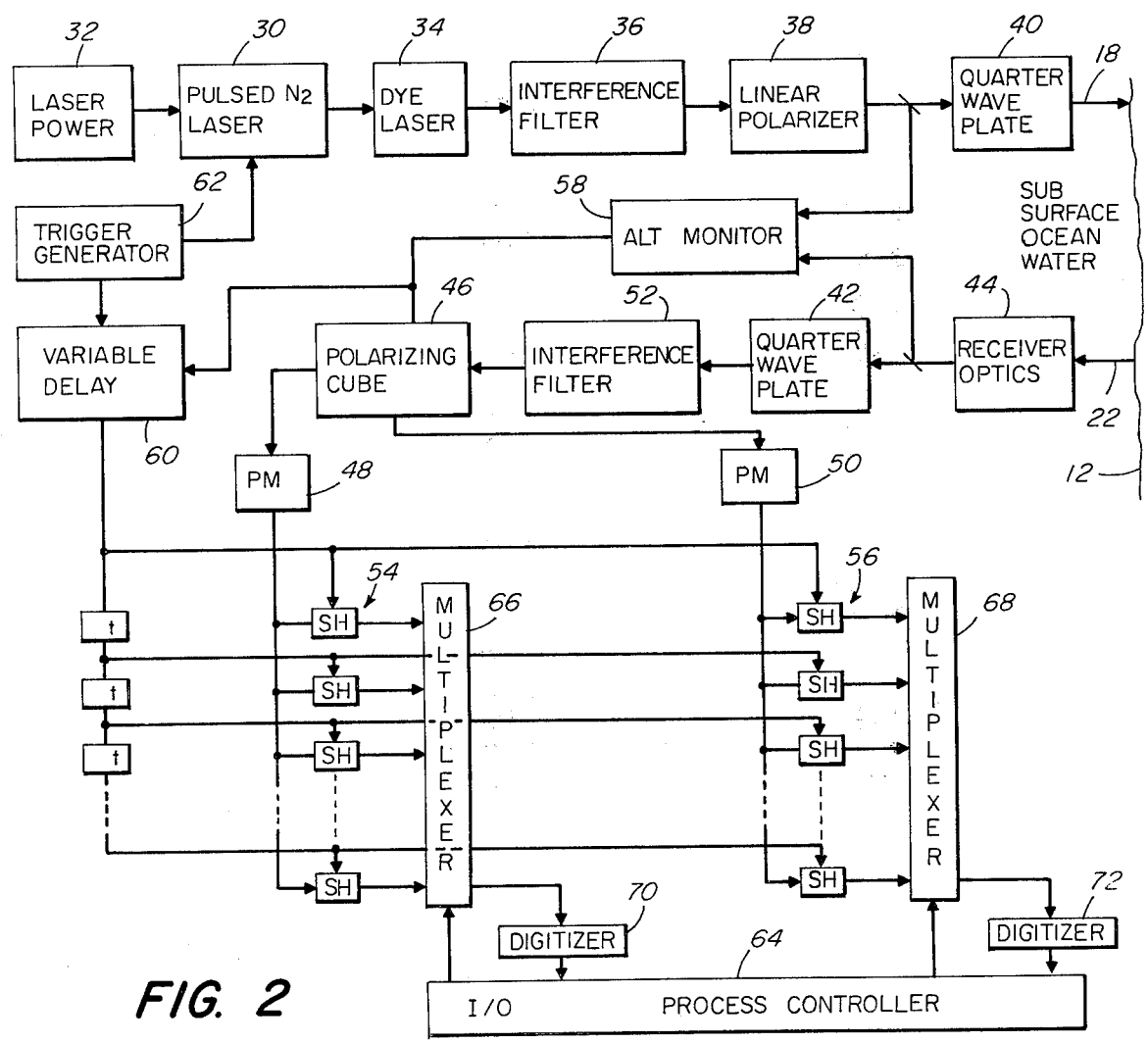
FIG. 2 is a block diagram of a system made according to the invention.

Referring now to FIG. 2 of the drawings, there is illustrated in block diagram a transmitter-receiver system adapted to generate a pulsed laser beam to detect the Raman backscattering and process return signal in order to determine water temperature at different depths. The system includes a pulsed laser 30 energized by a suitable power source 32 and directed through a dyelaser 34 for optimum wavelength selection. The use of a pulsed laser provides adequate depth resolution and typically the pulse duration may be on the order of 10 nanoseconds or less. In order to provide depth penetration, the laser should have a wavelength in the blue-green window wavelength region near 5000 angstroms. In order to provide sufficient signal strength so that meaningful measurements may be made, the laser should have an average power of 0.1 watt.

In practice, the laser may be an $N_2$ laser pump dyelaser. The laser beam is then passed through an interference filter 36.

Figure 4:
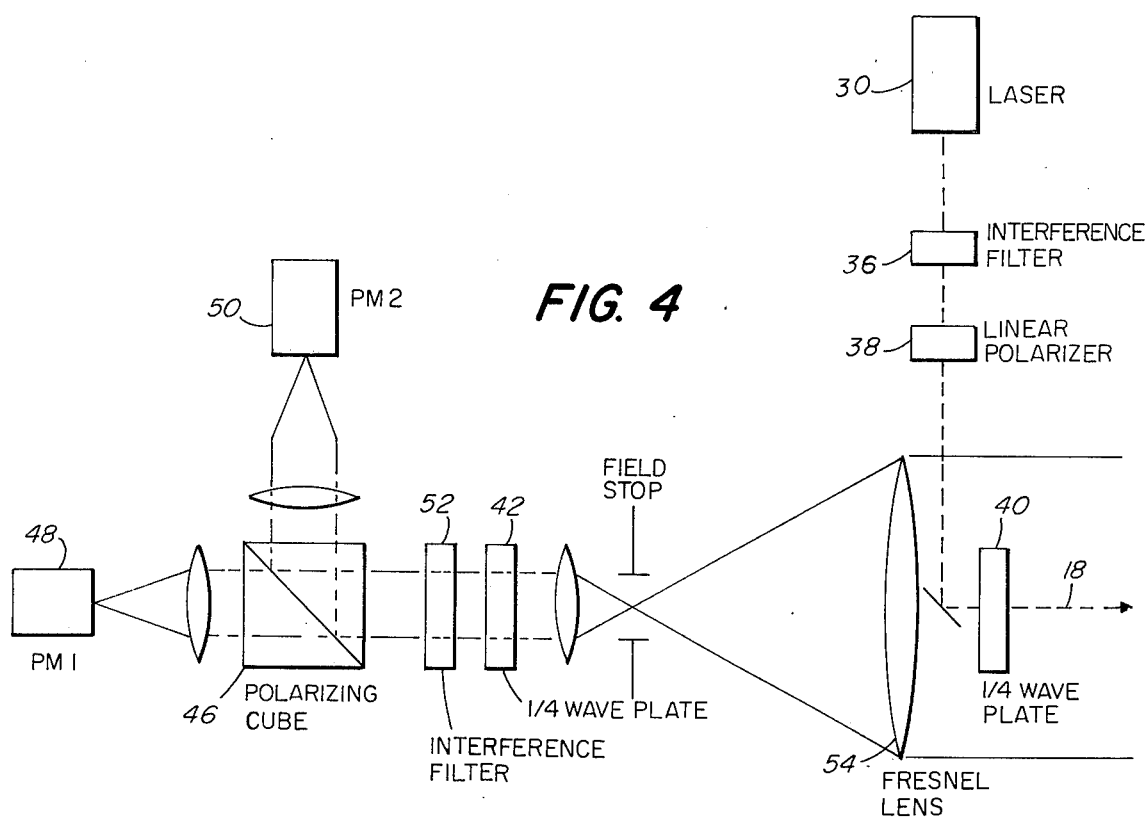
FIG. 4 is a diagram of an optical transmitter and receiving system made according to the invention.

The optical transmitter and receiver system is shown in detail in FIG. 4 and basically the function of the transmitter portion is to produce a pure circularly polarized laser beam 18 with no stray light at the Raman wavelength. This is accomplished by passing the output beam from the dye laser 34 sequentially through the narrow band interference transmission filter 36, a linear polarizer 38 and a quarter wave plate 40. The quarter wave plate 40 preferably should be the final element in the transmitter optical train since reflection immediately prior to transmission would not preserve the pure circular polarization condition and would require compensation.

The function of the receiver portion of the system is to measure the circular depolarization ratio from the Raman backscattered return signal 22. To accomplish this a second quarter wave plate 42 is used following the initial collection or receiver optics 44 to convert the circular components into linearly polarized components which are then separated by a beam splitting polarization cube 46 and detected by a matched pair of photomultiplying tubes 48 and 50. An interference filter 52 is also included in the receiver train, the primary function of which is to block scattered laser radiation while transmitting the Raman signals with high efficiency. A Fresnel type transmission element 54 is employed for the primary collector because its use avoids the necessity for polarization compensation that would be required if reflection optics were employed.

The return signal 22, once having passed through the optical portion of the system is converted into electrical signals by the photomultipliers 48 and 50 and then fed into detection electronic circuitry. The output from each of the two photomultipliers 48 and 50 is fed into a separate set of gated sample and hold circuits 54 and 56 that are sequentially gated beginning at the time corresponding to the arrival of reflected signals from the ocean surface. An altitude monitor 58 detects the time difference between the time of transmission of the laser pulse and the time of arrival of the strong return from the ocean surface at the laser frequency. This information is used to set a variable delay 60 between a trigger generator 62 and the sample and hold circuits 54 and 56 to ensure that each sample and hold circuit is recording data from the same ocean depth on each laser pulse. An input/output process controller 64 enables multiplexers 66 and 68 to sequentially digitize, by means of digitizers 70 and 72, the contents of the sample and hold circuits 54 and 56 and the information is then read into the process controller 64.

Figure 5:
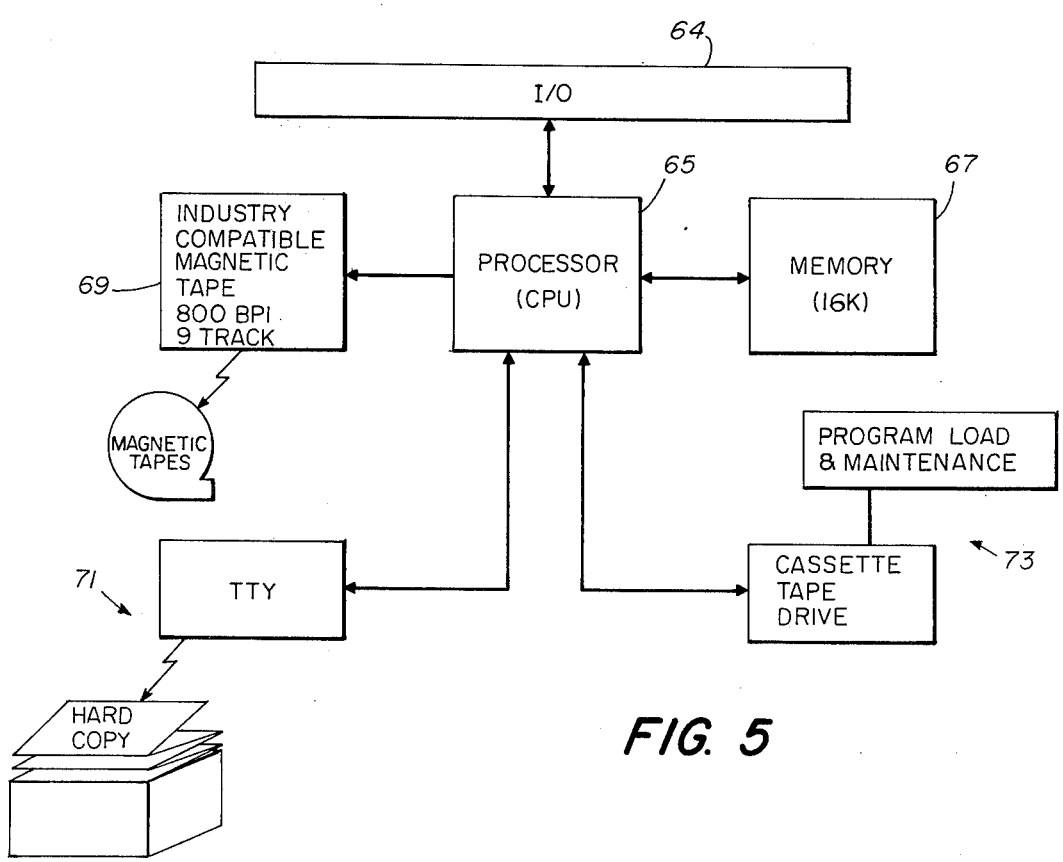
FIG. 5 is a block diagram of a processor sub-system made according to the invention.

The detection electronic portion of the system may be coupled to a computer (FIG. 5) by means of the input/output interface 64 to provide both real time data acquisition and control. A mini computer processor 65 may be used for this purpose and is provided with a memory 67 as well as outputs to magnetic tape systems 69 as well as to printed output systems 71. The processor 65 is programmable by means of soft ware components 73.

Figure 6:
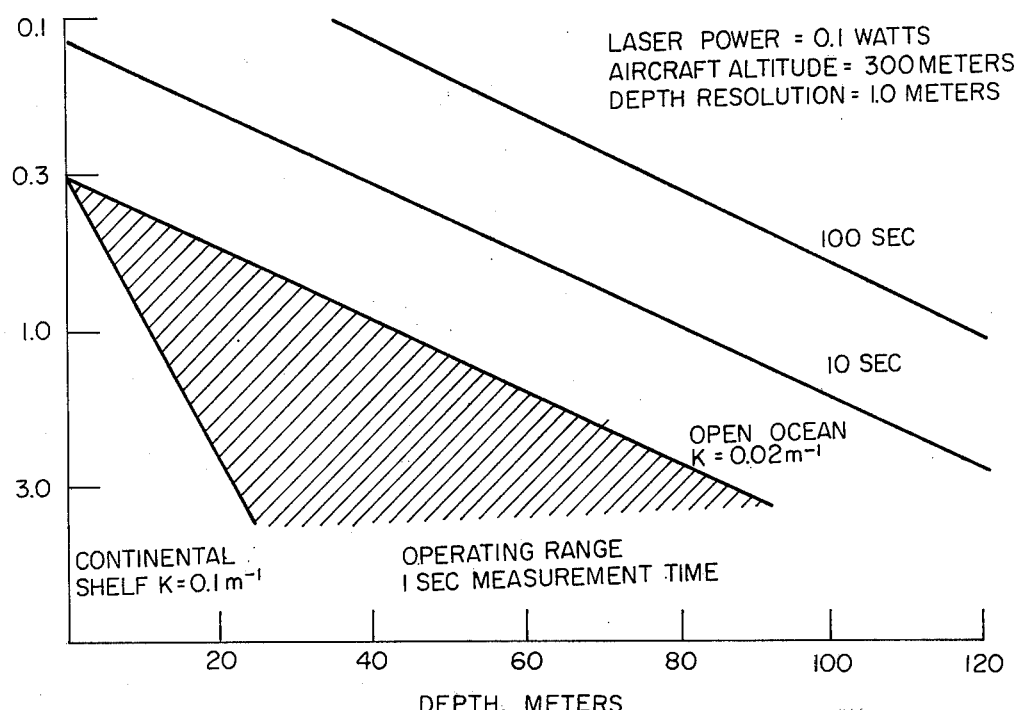
FIG. 6 is a plot of the temperature measurement accuracy as a function of water depth.

Referring now to FIG. 6, there is illustrated typical results obtained using the foregoing system. FIG. 6 shows the RMS one-sigma temperature measurement accuracy in ° C. as a function of depth in meters with attenuation coefficient and measurement time as parameters. The figure is calculated on the basis of an average laser power of 0.1 watts, an aircraft altitude of 300 meters and a depth resolution of 1.0 meters. The shaded area represents the available range operating conditions, with a one second measurement time for ocean water transparency ranging from continental shelf, $K = 0.1 m^{-1}$ to open ocean, $K = 0.02 m^{-1}$. The two lines labelled at 10 seconds and 100 seconds indicate the performance of open ocean $K = 0.02 m^{-1}$ water, with longer measurement times. Results can be enhanced using higher powered lasers and large diameter collectors. It should be noted that at a typical aircraft cruise speed a ten second measurement time corresponds to a linear average over about one kilometer of ocean surface, a scale size compatible with satellite measurements.

By way of background information, some of the physical characteristics of water should be described. The $H_2O$ molecule is highly polar and possesses a large dipole moment. This fact, together with its atomic composition, allows the $H_2O$ molecule in the liquid state to interact with other nearby $H_2O$ species and form hydrogen bonds. An individual molecule may participate in a maximum of four hydrogen bonds, one for each H atom and two for the O atom. The fact that liquid water contains hydrogen bonding is apparent from its infrared and Raman spectroscopy. The fundamental vibration frequencies due to the O—H bond occur at $3652 cm^{-1}$ (symmetric stretch) and $3750 cm^{-1}$ (asymmetric stretch). The O—H bond that occurs in the liquid state perturbs the fundamental frequency so that the infrared and Raman spectra due to the O—H in the liquid water show spectral broadening and shifts to lower frequencies in the 3400 to 3500cm$^{-1}$ range. Since the hydrogen bond is relatively weak, having an energy of only a few kcal/mole, the extent of hydrogen bonding in liquid is very sensitive to temperature. By monitoring the Raman spectrum of water in the O—H stretch region, this variation in structure due to the mobility of the hydrogen bonds may be observed and provides a means for measuring the temperature.

The Raman spectrum of liquid water in the O—H stretch region shifts towards longer wavelengths with increasing temperature. A much smaller red shift occurs as ionic species, e.g., CL ions, are added to the water. Both of these phenomena as well as additional spectroscopic information and other data have been used to support the hypothesis that liquid water contains $H_2O$ clusters held together by substantial hydrogen bonding in rapid equilibrium with monomeric $H_2O$ molecules. As the water temperature increases, this equilibrium shifts to a larger fraction of unbonded units. Analogously, as the ionic concentration is increased, the hydrogen bonded structures are decreased since more $H_2O$ molecules would be needed to cluster around the ionic species.

Figure 7:
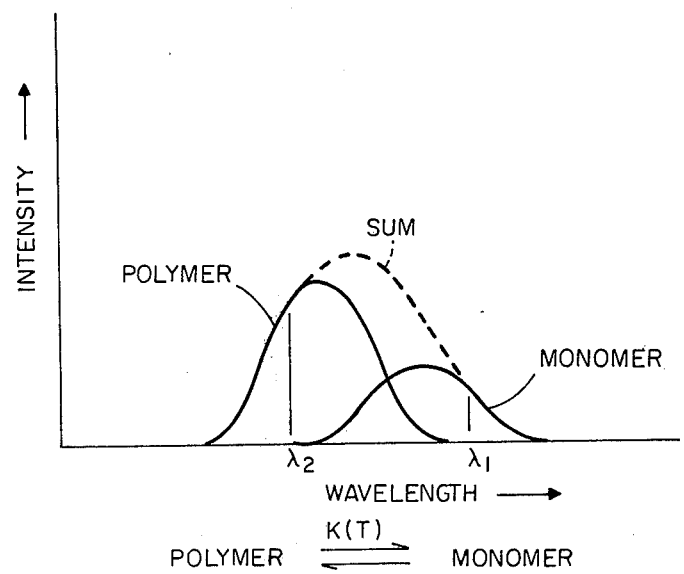
FIG. 7 illustrates the Raman spectrum and structure of liquid water.
Figure 7:
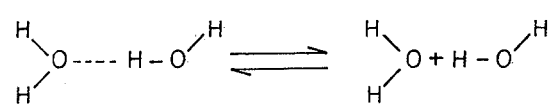

Liquid water is considered as being composed of two species, polymers, which are hydrogen bonded, and monomers, which are not, both in rapid equilibrium with each other. Each species has its individual Raman spectrum proportional to its concentration, as shown in FIG. 7; the total observed Raman spectrum being composed of the sum. Simultaneous measurement of the Raman spectra at the two wavelengths $\lambda_1$ and $\lambda_2$ provides a measure of the concentration ratio, and through the equilibrium constant, the temperature. This represents a two color technique by means of which water temperature may be measured at a distance.

In the depolarization method for measuring the temperature of water, the liquid water may be considered as a mixture of species which are completely hydrogen bonded and those which are not. The former possess symmetric structure vibrations and would be expected to preferentially scatter polarized radiation. Hence, in the same way the liquid water structure is reflected in the shape of the Raman spectrum, similar information is contained in the polarization of the scattered radiation.

The total Raman intensity, I, as a function of scattering angle $\theta$, is given by the expression $$I(\theta) = (kI_o/45)[45\alpha^2 + 7\beta^2]$$

Where $I_O$ is the intensity of the incident radiation and $\alpha$ and $\beta$ and the isotopic and unisotopic part of the differential polarizability tensor. $\alpha$ and $\beta$ are related to the molecular polarizability and are temperature dependent. For observation of backscattered radiation, $\theta = 0$. For linear polarized incident radiation a depolarization ratio $\rho_l$ can be defined $$\rho_l = I_\perp/I_\parallel = 3\beta^2/(45\alpha^2 + 4\beta^2)$$

Where $I_\parallel$ and $I_\perp$ are the parallel and perpendicular polarized polarization intensities. The bulk of the Raman return for water is composed of $I_\parallel$. Hence, $\rho_l$ is a small number and the accuracy of such a measurement is inherently low.

However, circularly polarized light can be used for Raman scattering and in an analogous manner to the plane polarized radiation, the scattered return will contain components of both circular polarizations. A reversal coefficient or circular depolarization ratio $\rho_c$ can be defined and related to the linear depolarization ratio $$\rho_c = I_l/I_r = 2\rho_l/1 - \rho_l$$

Where $I_l$ and $I_r$ are left and right, circularly polarized return respectively. Since $$\rho_l \leq \tfrac{3}{4}, \rho_c \leq 6$$

and is a more accurate measurement of water temperature than $\rho_l$.

The circular depolarization ratio of liquid water is a function of temperature. The ratio is approximately linear over a temperature range of about 10° to 45° C. and determines an average sensitivity of about 1%/C.° which is comparable to the maximum sensitivity observed for the two color method. The circular depolarization ratio also varies with salinity, but this effect may be minimized by a proper selection of wavelength and may be neglected for all but the most accurate measurements. The most important advantage of the use of the depolarization ratio for water temperature is the use of a single Raman wavelength.

The performance of the temperature measurement system utilizing the depolarization ratio will be degraded by any uncalibrated effect that depolarizes either the laser beam or the Raman scattered beams. Particulates in the ocean will cause some depolarization by single and multiple off-axis scattering. Single scattered light scattered at very small angles, e.g., $10^{-3}$ radians will be collected by the receiver. Scattered light at larger angles can be collected when multiple scattering occurs. The off-axis scattered light from a particle in general will be eliptically polarized. Because of the nature of the scattering the ocean cannot be universely characterized, the temperature sensitivity of the system will be degraded. Small angle scattering may introduce an absolute temperature uncertainty of 0.3° C. per attenuation length. This uncertainty is independent of laser power or integration time.

The number of Raman photoelectrons collected per second by an optical detector in a pulsed laser backscattering system can be expressed by the following equation:

$$N_{PE} = N_{LASER} N_{SCAT} \sigma_{RAMAN} \Delta R \Omega \, \epsilon_{pe} \epsilon_{op} T \lambda_1 T \lambda_2$$

where
 $N_{PE}$ = number of Raman photoelectrons detected,
 $N_{LASER}$ = the number of laser photons per second,
 $N_{SCAT}$ = density of molecular scatters of a given species,
 $\sigma_{RAMAN}$ = Raman scattering cross section per particle per steradian,
 $\Delta R$ = range resolution,
 $\omega$ = detection solid angle,
 $\epsilon_{pe}$ = photocathode photoelectric efficiency,
 $\epsilon_{op}$ = optical systems efficiency,
 $T_{\lambda_1} T_{\lambda_2}$ = two way transmission, $T_{\lambda_1}$ at laser wavelength, $T_{\lambda_2}$ at Raman wavelength.

It can be seen from the above that if the transmitter and receiver system parameters are known, and if the Raman scatterer has a known cross-section and density such as liquid water, then a measure of the Raman scattering from a single range cell can be used to determine the two-way transmission to that range cell. The system thus acts as a single ended transmissometer.

The product of the system typically may yield a total Raman signal return of $3.5 \times 10^5$ photoelectrons per second with the assumption of unity two-way transmission loss. In an efficient Raman system using a pulsed laser, the limiting noise can be reduced to the shot noise in the laser induced signal itself. Therefore, the signal to noise ratio can be given by the square root of the total number of photoelectrons collected in a given measurement interval. If the signal in the above calculations is assumed to be equally divided between the two polarizations, the basic signal to noise ratio of $(1.75 \times 10^5)^{\frac{1}{2}}$ or 418 would be available. Based on measurement sensitivity of 1% per C.° this would mean that a temperature precision of $(1/418) \times 100 \approx 0.3$ C.° would have been achieved.

Figure 8:
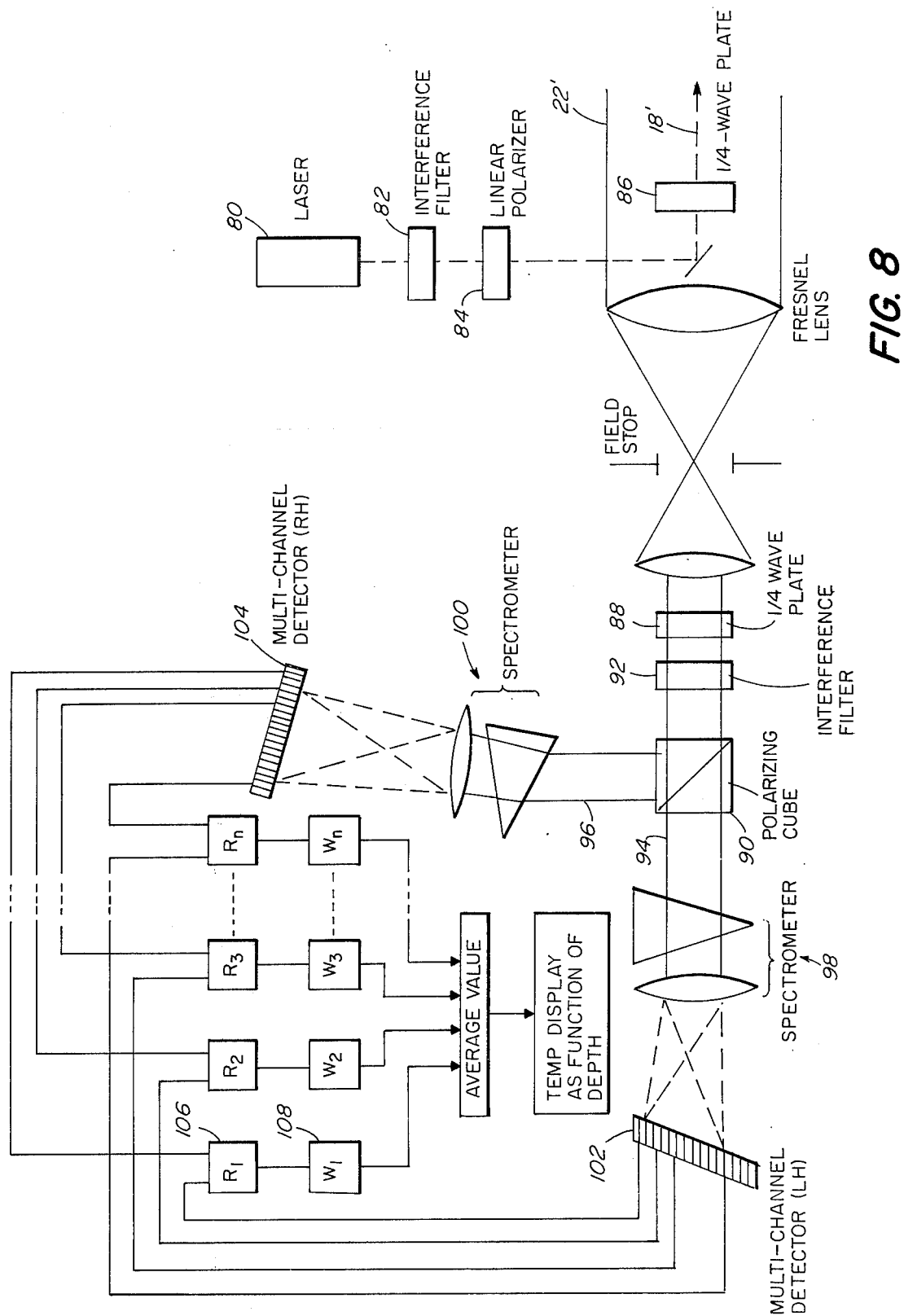
FIG. 8 is a schematic diagram showing a modification of the invention.

The ability to achieve depth penetration depends critically on the attenuation coefficient of the particular water and is highly variable among open ocean, continental shelf and coastal waters. The following table indicates the various types of ocean waters with values of attenuation coefficients, optimum transmission window ranges, and the rate of laser beam power loss in dB per meter.

multi element detectors 102 and 104. In FIG. 8 these multi element detectors are labeled as multi channel detector RH and multi channel detector LH. The signals from the separate channels are sent to ratio meters $R_1$-$R_n$ 106 where the ratios of the RH and LH polarizations are compared on a wavelength by wavelength basis. The ratio is thus determined of appropriately weighted by the weighting factors $W_1$-$W_n$ 108. The resultant weighted ratios are then averaged to determine the temperature using a previously obtained calibration curve or polarization intensity ratio versus temperature. The temperature as a function of depth can be determined if the signal ratios are determined as a function of time using the usual range gating techniques.

Figure 9:
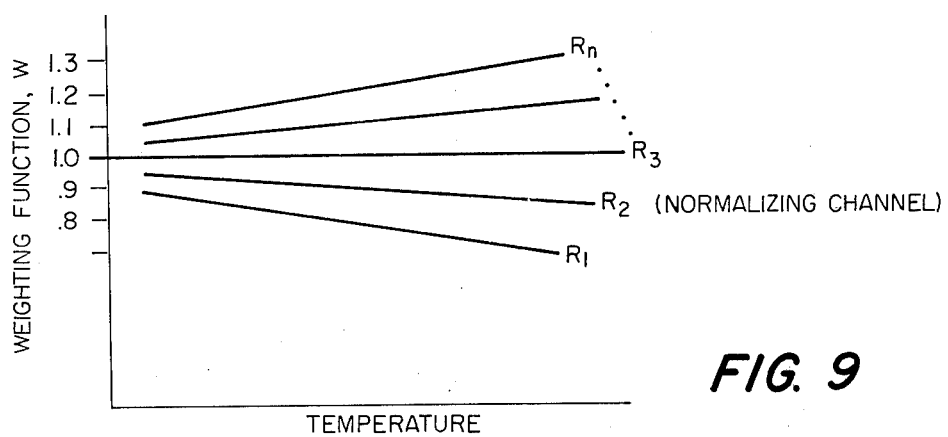
FIG. 9 illustrates a set of weighting function curves, and, FIG. 10 is a diagram of a detection network made according to the invention.

The weighting functions are calibrated by first using the system to measure the polarization intensity ratios at each wavelength from water at a series of known temperatures and then computing the weighting functions required to produce the same intensity ratio for all channels. A set of weighting function curves, as shown in FIG. 9, will be produced in which one channel, $R_3$, is used as the normalizing channel.

Using the two-polarization ratio, there is some natural occurring depolarization of light and sea water, as previously indicated, so that the downward directed

| Underwater Windows For Various Ocean Waters | | | | | |
|---|---|---|---|---|---|
| | | | | TRANSMISSION WINDOW | |
| WATER TYPE | | | K | Loss | |
| TYPE | LOCATION | | $(M^{-1})$ | (dB/m) | (nm) |
| Clearest Ocean | | Below Thermocline | 0.02 | 0.087 | 430–470 |
| | | | 0.03 | 0.130 | 440–480 |
| Warm Ocean | Open Ocean;Tropical and Subtropical | Above Thermocline | 0.04 | 0.170 | 470–490 |
| Cool Ocean | Open Ocean;Temperate Subartic and Arctic | | 0.07 | 0.300 | 475–495 |
| Shelf | Continental Shelf | Surface to Bottom | 0.10 | 0.430 | 490–510 |
| Coastal | Coastal;Relatively Shallow Water | Surface to Bottom | 0.16 | 0.695 | 510–550 |
| Very Turbid | Inshore Coastal; Harbor and Bay Water | Surface to Bottom | 0.40 | 1.737 | 550–570 |

Referring now to FIG. 8 of the drawings, there is illustrated a modification of the invention, and in this embodiment there is shown a multi-wavelength, two-polarization detection system. The FIG. 8 system combines both the transmitter and the receiver and it is the function of the transmitter to produce a pure, circularly polarized laser beam 18' with no stray light at the Raman wavelength. This is accomplished by passing the output beam from a dye laser 80 sequentially through a narrow-band interference transmission filter 82, a linear polarizer 84 and a quarter wave plate 86. The function of the receiver is to measure the circular depolarization ratio from the Raman backscattered return 22'. To accomplish this a second quarter wave plate 88 is used following the initial collection optics to convert the circular components into linearly polarized components which are then separated by a beam splitting polarization cube 90. An interference filter 92 is also included in the receiver train, the primary function of which is to block scattered laser radiation while transmitting the Raman band with high efficiency.

The two separate linearly polarized beams 94 and 96 are each analyzed spectrally by passing the light in each beam through separate spectrometers 98 and 100 and then detecting the resulting dispersed spectrum with laser beam 18' and the upwelling Raman radiation return signal 22' are, to some extent, depolarized by the sea water itself. It has been shown that there is a correlation between the depolarization error introduced by the water and the number of attenuation lengths traversed. The problem is to measure the transparency of the water in real time so that the appropriate depolarization correction, as a function of both depth and wavelength, can be applied.

Figure 10:
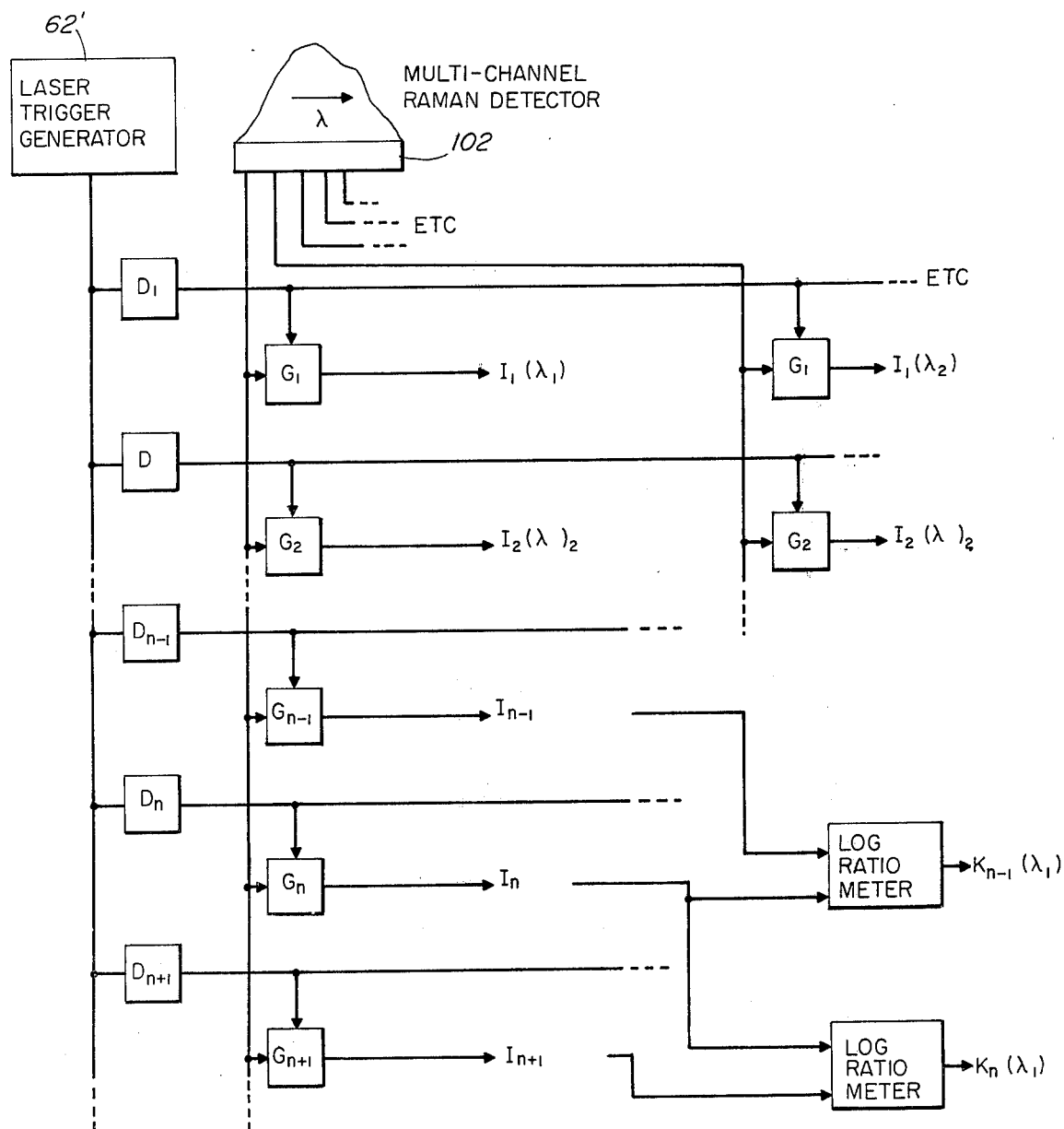

This is accomplished by the detection network shown in FIG. 10. The Raman water band is detected on a wavelength by wavelength basis by means of a multi-channel detector 102. The signal from each wavelength is sent to a series of gated integrators $G_1$, $G_2$, etc. A timing signal from a laser trigger generator 62' is passed through a set of delay generators $D_1$, $D_2$, etc., to sequentially actuate the gated integrators. The output of the gated integrators $I_1$, $I_2$, etc., are thus a measure of the Raman scattering obtained for each wavelength as a function of depth.

The diffuse attenuation coefficient K is obtained as a function of depth by taking the natural log ratio of successive pairs of outputs of the gated integrators. For example, $Kn = \ln(In-1/In)$. The result is a matrix of K values as a function of both depth and wavelength. The K values thus obtained can be used to apply the appropriate depolarization corrections for each wavelength.

In practice, it is desirable to tune the wavelength of the laser source to a wavelength such that the Raman band occurs at a wavelength of maximum water transmission. The foregoing techniques can be combined with a suitable laser to insure operation at the most efficient wavelength for maximum transmission.

Having thus described the invention, what we claim and desire to obtain by Letters Patent of the United States is:

1. Apparatus for remotely monitoring the subsurface property of a body of water comprising
   (a) first means for generating and directing a beam of laser light circularly polarized in one direction and of a frequency adapted to penetrate deeply into said water,
   (b) second means for detecting the Raman backscatter produced by said beam, said backscatter including components polarized in said one direction and in the opposite direction, and,
   (c) third means for analyzing the dual polarization backscatter on a wavelength segment by wavelength segment basis, and,
   (d) fourth means for obtaining separate ratios of the intensity of one polarization component to the other polarization component for each wavelength segment, said ratios being a function of the property of the water.

2. Apparatus, according to claim 1, wherein said first means includes pulsing means for pulsing said beam.

3. Apparatus, according to claim 1, wherein said second means includes light depolarizing means for separating differently polarized components from said backscatter.

4. Apparatus, according to claim 1, including range gating means operatively connected to said first and second means to obtain data with respect to the property of the water at different water depths.

5. The method of remotely monitoring the sub-surface properties of a body of water, comprising the steps of:
   (a) generating a beam of laser light, circularly polarized in one direction and of a frequency adapted to penetrate deeply into said water,
   (b) directing said beam into said water,
   (c) detecting the Raman backscatter produced by the said beam, said backscatter including components polarized in said one direction and in the opposite direction, and
   (d) analyzing the dual polarization backscatter on a wavelength segment by wavelength segment basis and obtaining separate ratios of the intensity of one polarization component to the other polarization component for each wavelength segment.

6. The method of claim 5 wherein said light is pulsed.

7. The method of claim 6 wherein the diffuse attenuation coefficient K is obtained as a function of both depth and wavelength by obtaining the natural log ratio of the said backscatter at successive pairs of depths for each wavelength segment.

8. The method of claim 5 wherein said subsurface water property is temperature.

9. The method of claim 5 wherein said subsurface water property is salinity.

* * * * *